US00RE36820E

United States Patent [19]

McGinley et al.

[11] E Patent Number: Re. 36,820

[45] Reissued Date of Patent: Aug. 15, 2000

[54] REMOVABLE OPTOELECTRONIC MODULE

[75] Inventors: James W. McGinley, Chicago; Daniel S. Poplawski, Montgomery, both of Ill.

[73] Assignee: Methode Electronics, Inc., Chicago, Ill.

[21] Appl. No.: 09/089,584

[22] Filed: Jun. 3, 1998

Related U.S. Patent Documents

Reissue of:

[64] Patent No.: 5,546,281
Issued: Aug. 13, 1996
Appl. No.: 08/372,780
Filed: Jan. 13, 1995

[51] Int. Cl.[7] ..... H05K 5/00; G02B 6/00

[52] U.S. Cl. ..... 361/752; 361/756; 361/802; 439/76.1; 439/153; 385/92

[58] Field of Search ..... 361/752, 756, 361/759, 796, 801, 802; 439/151, 153; 385/88, 89, 92, 94

[56] References Cited

U.S. PATENT DOCUMENTS

| | | |
|---|---|---|
| Re. 32,502 | 9/1987 | Kumar . |
| 2,899,669 | 8/1959 | Johanson . |
| 3,264,601 | 8/1966 | Hartholz . |
| 3,332,860 | 7/1967 | Diebold et al. . |
| 3,474,380 | 10/1969 | Miller . |
| 3,497,866 | 2/1970 | Patton, Jr. . |
| 3,670,290 | 6/1972 | Angele et al. . |

(List continued on next page.)

FOREIGN PATENT DOCUMENTS

| | | |
|---|---|---|
| 0 228 278 | 12/1986 | European Pat. Off. . |
| 442 608 A2 | 8/1991 | European Pat. Off. . |
| 0 656 696 A1 | 2/1994 | European Pat. Off. . |
| 0652696A1 | 11/1994 | European Pat. Off. ..... H05K 9/00 |
| 94308071 | 5/1995 | European Pat. Off. . |
| 0 456 298 B1 | 2/1996 | European Pat. Off. . |
| 61-158046 | 9/1986 | Japan . |
| 61-188385 | 8/1987 | Japan . |
| 63-16496 | 2/1988 | Japan . |
| 63-65967 | 4/1988 | Japan . |
| 63-65978 | 4/1988 | Japan . |
| 63-82998 | 5/1988 | Japan . |
| 1-237783 | 9/1989 | Japan . |
| 2-87837 | of 1990 | Japan . |
| 2-151084 | 6/1990 | Japan . |
| 3-94869 | 4/1991 | Japan . |
| 4-270305 | 4/1991 | Japan . |
| 4-50901 | 2/1992 | Japan . |
| 4-165312 | 6/1992 | Japan . |
| 4-87809 | 7/1992 | Japan . |
| 4-221207 | 8/1992 | Japan . |
| 4-229962 | 8/1992 | Japan . |
| 4-230978 | 8/1992 | Japan . |
| 4-109593 | 9/1992 | Japan . |
| 4 234715 | 5/1993 | Japan . |
| 5-290913 | 5/1993 | Japan . |
| 5-211379 | 8/1993 | Japan . |
| 5-70955 | 9/1993 | Japan . |
| 2 264 843 | 8/1993 | United Kingdom . |
| 2264843 | 9/1993 | United Kingdom . |
| 9204364 | 9/1993 | United Kingdom . |

OTHER PUBLICATIONS

AMP PC Board Connectors, the specifications for which is contained in AMP, Inc. Product Catalog 82750, published in Jun. 1991.

(List continued on next page.)

*Primary Examiner*—Jayprakash N. Gandhi
*Attorney, Agent, or Firm*—David L. Newman

[57] ABSTRACT

A robust optoelectronic transceiver module which is quick, easy, and inexpensive to manufacture. The transceiver module has a main housing which consists of a potting box with potting material inserted therein. In addition, a circuit board is encased by the potting material. The circuit board has an optical subassembly mounted thereon. The optical subassembly extends outside of the potting box through a recess. Correspondingly, a recess cover is provided for forming a liquid fight seal between the recess cover, the potting box, and the optical subassembly.

49 Claims, 3 Drawing Sheets

U.S. PATENT DOCUMENTS

| | | |
|---|---|---|
| 3,673,545 | 6/1972 | Rundle . |
| 3,737,729 | 6/1973 | Carney . |
| 3,792,284 | 2/1974 | Kaelin . |
| 3,805,116 | 4/1974 | Nehmann . |
| 3,809,908 | 5/1974 | Clanton . |
| 3,976,877 | 8/1976 | Thillays . |
| 3,990,761 | 11/1976 | Jayne . |
| 4,149,072 | 4/1979 | Smith et al. . |
| 4,156,903 | 5/1979 | Barton et al. . |
| 4,161,650 | 7/1979 | Caoutte et al. . |
| 4,176,897 | 12/1979 | Cameron . |
| 4,217,488 | 8/1980 | Hubbard . |
| 4,226,491 | 10/1980 | Kazoma et al. . |
| 4,234,968 | 11/1980 | Singh . |
| 4,249,266 | 2/1981 | Nakamori . |
| 4,252,402 | 2/1981 | Puech et al. . |
| 4,257,124 | 3/1981 | Porter et al. . |
| 4,273,413 | 6/1981 | Bendiksen et al. . |
| 4,276,656 | 6/1981 | Petruk, Jr. . |
| 4,330,870 | 5/1982 | Arends . |
| 4,347,655 | 9/1982 | Zory et al. . |
| 4,357,606 | 11/1982 | Fortescue . |
| 4,360,248 | 11/1982 | Bickel et al. . |
| 4,366,565 | 12/1982 | Herskowitz . |
| 4,369,494 | 1/1983 | Bienvenn et al. . |
| 4,380,360 | 4/1983 | Parmer et al. . |
| 4,388,671 | 6/1983 | Hall et al. . |
| 4,393,516 | 7/1983 | Itani . |
| 4,399,563 | 8/1983 | Greenberg . |
| 4,408,273 | 10/1983 | Plow . |
| 4,422,088 | 12/1983 | Gfeller . |
| 4,427,879 | 1/1984 | Becher et al. . |
| 4,430,699 | 2/1984 | Segarra et al. . |
| 4,432,604 | 2/1984 | Schwab . |
| 4,437,190 | 3/1984 | Rozenwaig et al. . |
| 4,446,515 | 5/1984 | Sauer et al. . |
| 4,449,244 | 5/1984 | Kopainsky . |
| 4,453,903 | 6/1984 | Pukoite . |
| 4,459,658 | 7/1984 | Gabbe et al. . |
| 4,461,537 | 7/1984 | Raymer, II et al. . |
| 4,470,154 | 9/1984 | Yano . |
| 4,486,059 | 12/1984 | DeYoung . |
| 4,493,113 | 1/1985 | Forrest et al. . |
| 4,501,021 | 2/1985 | Weizzq . |
| 4,506,937 | 3/1985 | Cosmos et al. . |
| 4,510,553 | 4/1985 | Faultersack . |
| 4,511,207 | 4/1985 | Newton et al. . |
| 4,514,586 | 4/1985 | Waggoner . |
| 4,516,204 | 5/1985 | Sauer et al. . |
| 4,519,670 | 5/1985 | Spinner et al. . |
| 4,519,672 | 5/1985 | Rogstadius . |
| 4,519,673 | 5/1985 | Hamilton . |
| 4,522,463 | 6/1985 | Schwenda et al. . |
| 4,526,438 | 7/1985 | Essert . |
| 4,526,986 | 7/1985 | Fields et al. . |
| 4,527,286 | 7/1985 | Haworth . |
| 4,529,266 | 7/1985 | Delebecque . |
| 4,530,566 | 7/1985 | Smith et al. . |
| 4,531,810 | 7/1985 | Carlsen . |
| 4,533,208 | 8/1985 | Stowe . |
| 4,533,209 | 8/1985 | Segerson et al. . |
| 4,533,813 | 8/1985 | Rayburn et al. . |
| 4,534,616 | 8/1985 | Bowen et al. . |
| 4,534,617 | 8/1985 | Klootz et al. . |
| 4,535,233 | 8/1985 | Abraham . |
| 4,537,468 | 8/1985 | Begoix et al. . |
| 4,539,476 | 9/1985 | Donuma et al. . |
| 4,540,237 | 9/1985 | Winzer . |
| 4,540,246 | 9/1985 | Fantone . |
| 4,541,685 | 9/1985 | Anderson . |
| 4,542,076 | 9/1985 | Bednarz et al. . |
| 4,544,231 | 10/1985 | Peterson . |
| 4,544,233 | 10/1985 | Iwamoto et al. . |
| 4,544,234 | 10/1985 | DeVeau, Jr. et al. . |
| 4,545,074 | 10/1985 | Balliet et al. . |
| 4,545,077 | 10/1985 | Drapala et al. . |
| 4,545,642 | 10/1985 | Auracher et al. . |
| 4,545,643 | 10/1985 | Young et al. . |
| 4,545,644 | 10/1985 | DeVeau, Jr. et al. . |
| 4,545,645 | 10/1985 | Mignien . |
| 4,548,465 | 10/1985 | White . |
| 4,548,466 | 10/1985 | Evans et al. . |
| 4,548,467 | 10/1985 | Stoerk et al. . |
| 4,549,782 | 10/1985 | Miller . |
| 4,549,783 | 10/1985 | Schmachtenberg, III . |
| 4,550,975 | 11/1985 | Levinson et al. . |
| 4,553,811 | 11/1985 | Becker et al. . |
| 4,553,814 | 11/1985 | Bahl et al. . |
| 4,556,279 | 12/1985 | Shaw et al. . |
| 4,556,281 | 12/1985 | Anderton . |
| 4,556,282 | 12/1985 | Delebeque . |
| 4,557,551 | 12/1985 | Dyott . |
| 4,560,234 | 12/1985 | Shaw et al. . |
| 4,563,057 | 1/1986 | Ludman et al. . |
| 4,566,753 | 1/1986 | Mannschke . |
| 4,568,145 | 2/1986 | Colin . |
| 4,569,569 | 2/1986 | Stewart . |
| 4,573,760 | 3/1986 | Fan et al. . |
| 4,580,295 | 4/1986 | Richman . |
| 4,580,872 | 4/1986 | Bhatt et al. . |
| 4,588,256 | 5/1986 | Onstott et al. . |
| 4,589,728 | 5/1986 | Dyott et al. . |
| 4,595,839 | 6/1986 | Braun et al. . |
| 4,597,631 | 7/1986 | Flores . |
| 4,612,670 | 9/1986 | Henderson . |
| 4,614,836 | 9/1986 | Carpenter et al. . |
| 4,625,333 | 11/1986 | Takezawa et al. . |
| 4,629,270 | 12/1986 | Andrews, Jr. et al. . |
| 4,634,239 | 1/1987 | Buhrer . |
| 4,647,148 | 3/1987 | Katagiri . |
| 4,652,976 | 3/1987 | Fushimoto . |
| 4,663,240 | 5/1987 | Hajdu et al. . |
| 4,663,603 | 5/1987 | van Riemsdijk et al. . |
| 4,678,264 | 7/1987 | Bowen et al. . |
| 4,679,883 | 7/1987 | Assini et al. . |
| 4,695,106 | 9/1987 | Feldman et al. . |
| 4,697,864 | 10/1987 | Hayes et al. . |
| 4,708,433 | 11/1987 | Kakii et al. . |
| 4,720,630 | 1/1988 | Takeuchi et al. . |
| 4,722,584 | 2/1988 | Takii et al. . |
| 4,727,248 | 2/1988 | Meur et al. . |
| 4,762,388 | 8/1988 | Tanaka et al. . |
| 4,772,931 | 9/1988 | Rogers . |
| 4,798,430 | 1/1989 | Johnson et al. . |
| 4,807,006 | 2/1989 | Rogers et al. . |
| 4,807,955 | 2/1989 | Ashman et al. . |
| 4,811,165 | 3/1989 | Currier et al. . |
| 4,812,133 | 3/1989 | Fleak et al. . |
| 4,840,451 | 6/1989 | Sampson et al. . |
| 4,844,581 | 7/1989 | Turner . |
| 4,847,771 | 7/1989 | Inove . |
| 4,849,944 | 7/1989 | Matsushita . |
| 4,857,002 | 8/1989 | Jensen et al. . |
| 4,881,789 | 11/1989 | Levinson . |
| 4,884,336 | 12/1989 | Waters et al. . |
| 4,897,711 | 1/1990 | Blonder et al. . |
| 4,906,197 | 3/1990 | Noll . |
| 4,913,511 | 4/1990 | Tabalba et al. . |
| 4,927,225 | 5/1990 | Levinson . |
| 4,945,229 | 7/1990 | Daly et al. . |
| 4,953,929 | 9/1990 | Basista et al. . |
| 4,977,329 | 12/1990 | Eckhardt et al. . |

| | | | |
|---|---|---|---|
| 4,979,787 | 12/1990 | Lichenberger . | |
| 4,986,625 | 1/1991 | Yamada et al. . | |
| 4,990,104 | 2/1991 | Schieferly . | |
| 5,004,434 | 4/1991 | Aiello et al. . | |
| 5,005,939 | 4/1991 | Arvanitakis et al. . | |
| 5,006,286 | 4/1991 | Dery et al. . | |
| 5,011,246 | 4/1991 | Corradetti et al. . | |
| 5,011,425 | 4/1991 | Van Zanten et al. . | |
| 5,013,247 | 5/1991 | Watson . | |
| 5,035,482 | 7/1991 | Berge et al. . | |
| 5,039,194 | 8/1991 | Block et al. | 383/88 |
| 5,043,775 | 8/1991 | Lee . | |
| 5,045,971 | 9/1991 | Ono et al. . | |
| 5,046,955 | 9/1991 | Olsson . | |
| 5,060,373 | 10/1991 | Machura et al. . | |
| 5,082,344 | 1/1992 | Mulholland et al. . | |
| 5,084,802 | 1/1992 | Nguyenngoc . | |
| 5,093,879 | 3/1992 | Bregman et al. . | |
| 5,094,623 | 3/1992 | Scharf et al. . | |
| 5,099,307 | 3/1992 | Go et al. . | |
| 5,101,463 | 3/1992 | Cubukciyan et al. . | |
| 5,104,243 | 4/1992 | Harding . | |
| 5,107,404 | 4/1992 | Tam . | |
| 5,108,294 | 4/1992 | Marsh et al. . | |
| 5,109,453 | 4/1992 | Edwards et al. . | |
| 5,116,239 | 5/1992 | Siwinski . | |
| 5,117,476 | 5/1992 | Yingst et al. . | |
| 5,118,362 | 6/1992 | St. Angelo et al. . | |
| 5,120,578 | 6/1992 | Chen et al. . | |
| 5,122,893 | 6/1992 | Tolbert . | |
| 5,125,849 | 6/1992 | Briggs et al. . | |
| 5,134,677 | 7/1992 | Leung et al. . | |
| 5,136,152 | 8/1992 | Lee . | |
| 5,136,603 | 8/1992 | Hasnain et al. . | |
| 5,138,537 | 8/1992 | Wang . | |
| 5,155,786 | 10/1992 | Ecker et al. . | |
| 5,168,537 | 12/1992 | Rajasekharan et al. . | |
| 5,170,146 | 12/1992 | Gardner . | |
| 5,183,405 | 2/1993 | Elicker et al. . | |
| 5,202,943 | 4/1993 | Carden et al. | 385/92 |
| 5,212,752 | 5/1993 | Stephenson et al. . | |
| 5,234,353 | 8/1993 | Scholz et al. . | |
| 5,241,614 | 8/1993 | Ecker et al. . | |
| 5,243,678 | 9/1993 | Schaffer et al. . | |
| 5,259,054 | 11/1993 | Benzoni et al. . | |
| 5,271,079 | 12/1993 | Levinson . | |
| 5,274,729 | 12/1993 | King et al. . | |
| 5,280,191 | 1/1994 | Chang . | |
| 5,285,466 | 2/1994 | Tabatabaie . | |
| 5,285,511 | 2/1994 | Akkapeddi et al. . | |
| 5,285,512 | 2/1994 | Duncan et al. . | |
| 5,289,345 | 2/1994 | Corradetti et al. . | |
| 5,295,214 | 3/1994 | Card et al. . | |
| 5,296,813 | 3/1994 | Holmes et al. . | |
| 5,304,069 | 4/1994 | Brunker et al. . | |
| 5,305,182 | 4/1994 | Chen . | |
| 5,317,663 | 5/1994 | Beard et al. . | |
| 5,321,819 | 6/1994 | Szczepanek . | |
| 5,325,455 | 6/1994 | Henson et al. . | |
| 5,329,428 | 7/1994 | Block et al. . | |
| 5,329,604 | 7/1994 | Baldwin et al. . | |
| 5,333,225 | 7/1994 | Jacobowitz et al. . | |
| 5,337,391 | 8/1994 | Lebby | 385/88 |
| 5,337,396 | 8/1994 | Chen et al. . | |
| 5,337,398 | 8/1994 | Benzoni et al. | 385/90 |
| 5,345,524 | 9/1994 | Lebby et al. . | |
| 5,345,530 | 9/1994 | Lebby et al. | 385/88 |
| 5,356,300 | 10/1994 | Costello et al. . | |
| 5,357,402 | 10/1994 | Anhalt . | |
| 5,361,244 | 11/1994 | Nakamura et al. . | |
| 5,366,664 | 11/1994 | Varadan et al. . | |
| 5,375,040 | 12/1994 | Cooper et al. . | |
| 5,397,242 | 3/1995 | Laisne et al. . | |
| 5,414,787 | 5/1995 | Kurata . | |
| 5,416,668 | 5/1995 | Benzoni . | |
| 5,416,870 | 5/1995 | Chun et al. . | |
| 5,416,871 | 5/1995 | Takahashi et al. | 385/88 |
| 5,416,872 | 5/1995 | Sizer, II et al. . | |
| 5,428,704 | 6/1995 | Lebby et al. . | |
| 5,432,630 | 7/1995 | Lebby et al. . | |
| 5,434,747 | 7/1995 | Shibata . | |
| 5,446,814 | 8/1995 | Kuo et al. . | |
| 5,452,387 | 9/1995 | Chun et al. . | |
| 5,455,703 | 10/1995 | Duncan et al. . | |
| 5,470,259 | 11/1995 | Kaufman et al. . | |
| 5,475,734 | 12/1995 | McDonald et al. . | |
| 5,478,253 | 12/1995 | Biechler et al. . | |
| 5,482,658 | 1/1996 | Lebby et al. . | |
| 5,487,678 | 1/1996 | Tsuji et al. . | |
| 5,491,712 | 2/1996 | Lin et al. . | |
| 5,499,311 | 3/1996 | DeCusatis . | |
| 5,499,312 | 3/1996 | Hahn et al. . | |
| 5,515,468 | 5/1996 | DeAndrea et al. . | |
| 5,528,408 | 6/1996 | McGinley et al. . | |
| 5,535,296 | 7/1996 | Uchida . | |
| 5,546,281 | 8/1996 | Poplawski . | |
| 5,547,385 | 8/1996 | Spangler . | |
| 5,548,677 | 8/1996 | Kakii et al. . | |
| 5,550,941 | 8/1996 | Lebby et al. . | |
| 5,554,037 | 9/1996 | Uleski . | |
| 5,561,727 | 10/1996 | Akita et al. . | |
| 5,567,167 | 10/1996 | Hayaski . | |
| 5,577,064 | 11/1996 | Swirhun et al. . | |
| 5,580,269 | 12/1996 | Fan . | |
| 5,596,663 | 1/1997 | Ishibashi et al. . | |
| 5,598,319 | 1/1997 | Lee . | |
| 5,599,595 | 2/1997 | McGinley et al. . | |
| 5,629,919 | 5/1997 | Hayashi et al. . | |
| 5,631,998 | 5/1997 | Han . | |
| 5,687,267 | 11/1997 | Uchida . | |
| 5,717,533 | 2/1998 | Poplawski et al. . | |
| 5,724,729 | 3/1998 | Sherif et al. . | |
| 5,734,558 | 3/1998 | Poplawski et al. . | |
| 5,736,782 | 4/1998 | Schairer . | |
| 5,767,999 | 6/1998 | Kayner . | |
| 5,779,504 | 7/1998 | Dominiak et al. . | |

OTHER PUBLICATIONS

Thomas & Betts Info–Lan Transceiver catalog publisehd by Thomas & Betts Corporation in 1988.

Edward R. Salmon, "Encapsulation of Electronic devices and components", published in 1987.

Deposition of Steve Joiner, Ph.D., including referenced exhibits, taken May 12, 1998 in San Francisco, California in connection with Methode Electronics, Inc. v. Vixel Corporation, Case No. C97–21051 RMW (EAI).

AMP "PC Board Connectors" Product Catalog 82759 published Jun. 1991.

AMP Inc. "Lytel Molded–Optronic SC Duplex Transceiver" Dec. 1993 from Catalog 65922.

Amphenol Engineering News dtd Nov. 1994 vol. 7 No. 6.

AT&T Microelectronics, "1408–Type ODL Transceiver" Feb. 1994 preliminary data sheet.

Baldwin and Kellerman, "Fiber Optic Module Interface Attachment " Research disclosure Oct. 1991.

Block and Gaio "Optical Link Card guide/Retention Sys" Research Disclosures Apr. 1993.

Cinch Hinge Connectors Catalog CM–16, Jul. 1963.

Computer Reseller News May 24, 1999—Cicso Makes Mark in Switch Clusting.

Conductive Coatings by Dieter Gwinner (No Date).

Encapsulation of Electronic Devices and Components by Edward R. Salmon (No Date).
Gigabit Interface Converter (GBIC) (No Date).
Hewlett–Packard Information for HP 5061–5800 Fiber Optic Interface converter including Declaration of Steve Joiner, Ph.D. (No Date).
Hewlett–Packard Optoelectronics Designer's Catalog (1991–1992).
High Density Input/Output Connector Systems by Robert C. Herron (No Date).
IBM Technical Disclosure Bulletin dated Mar., 1987 vol. 29 No. 10.
IBM Fiber Channel 266 Mb/sOptical Link Cards (No Date).
James C. Pintner, Senior Attorney, Hewlett–Packard Company, letter dated Aug. 19, 1998.
Japanese Standards Association's "Japanese Industrial Standard F04 Type Connectors for Optical Fiber Cords JIS C 5973" 1990.
Leydig, Voit & Mayer, Ltd. letter to Methode Electronics from Mark E. Phelps, dated Jun. 21, 1999.
Methode Electronics letter to Leydig, Voit & Mayer, Ltd. from David L. Newman, dated Jun. 30, 1999.
Leydig, Voil & Mayer, Ltd. letter to Methode Electronics from Mark E. Phels, dated Jun. 30, 1999.
Low Cost Fiber Physical Layer Medium Dependent Common Transceiver Footprint data sheet Jun. 23, 1992.
Siemens, "Low–Cost ATM" Advertisement (No Date).
Steve Joiner, Ph.D. Deposition Transcript and Exhibits dated May 12, 1998.
Sumitomo Electric Fiber Optics Corp. "Transceiver Manufacturers to Support Common Footprint for Desktop FDDI Applications," Jun. 1992.
Headsup—Sumitomo Electric Lightwave joins other in announcement (No Date).
Sumitomo Electric Fiber Optics Corp Product Bulletin—FDDI Optical Transceiver (No Date).
Preliminary Bulletin FDDI Optical Transceiver Module—Sumitomo Electric (No Date).
Thomas & Betts Catalog 1988 for Info–Lan Modem (No Date).
Weik, "Communication Standard Dictionary" 1983 p. 454.
Vixel Corporation's Response Chart (Methode Electronics, Inc. v. Vixel Corporation. C98 20237 RMW EAI) Including explanation of 5,717,533 and 5,734, 558 and citation of additional references; prepared Oct. 16, 1998.

FIG.3
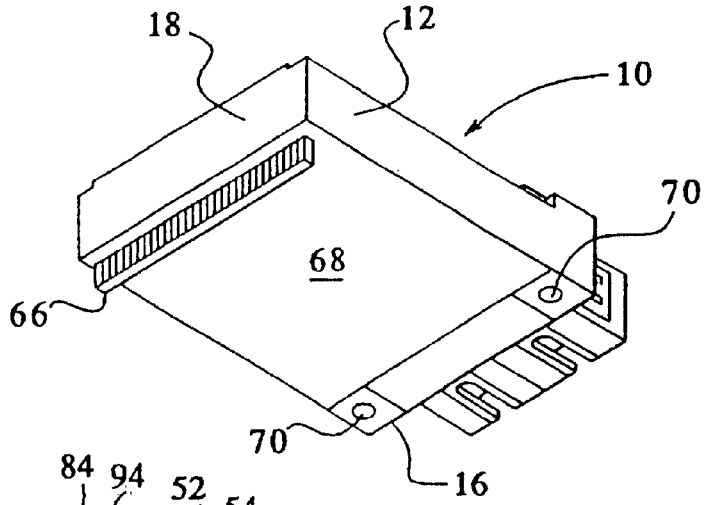
FIG.4
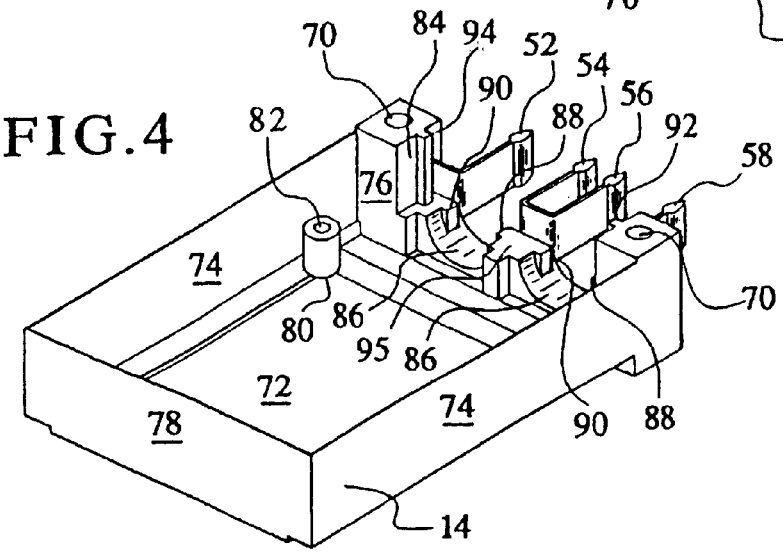
FIG.5
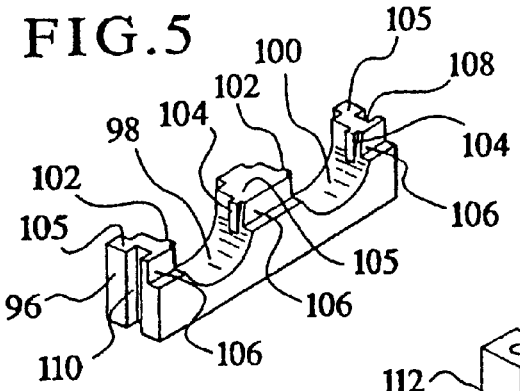
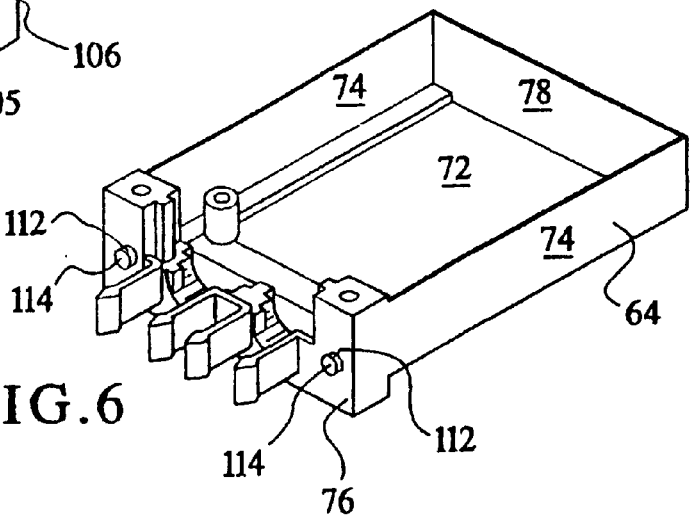
FIG.6

REMOVABLE OPTOELECTRONIC MODULE

Matter enclosed in heavy brackets [ ] appears in the original patent but forms no part of this reissue specification; matter printed in italics indicates the additions made by reissue.

BACKGROUND OF THE INVENTION

This invention relates generally to optoelectronic transceiver modules and in particular, it relates to an optoelectronic transceiver module, and its method of manufacture, whereby the module is inexpensive to manufacture, has a small yet robust package, and can be installed and replaced via a ribbon style connector.

Optoelectronic transceiver modules provide for the bi-directional transmission of data between an electrical interface and an optical data link. The module receives electrically encoded data signals which are converted into optical signals and transmitted over the optical data link. Likewise, the module receives optically encoded data signals which are converted into electrical signals and transmitted onto the electrical interface.

Normally, the transceiver is mounted onto one of the circuit card assemblies of a host computer, input/output system, peripheral device, or switch. Therefore, as will all electronic equipment, there is a need for a transceiver having an outer package design which occupies as little circuit card surface area as possible.

In addition, there is a need for a transceiver module which is highly reliable and durable. One method presently used to ensure reliability and durability is to encapsulate the electronics of the transceiver within an insulative potting material. Encapsulating the transceiver electronics results in reducing vibration sensitivity and prevents unauthorized personnel from meddling with the module's electronics.

Presently, the molding of the potting material around the transceiver electronics is performed by placing the electronics within a silicone mold. Any portion of the electronics which extends outside of the mold is caulked, by hand, with a silicone compound which provides for a liquid tight seal. Once the mold is sealed, potting material is inserted therein. After the potting material is allowed to cure, the silicone mold is peeled away from the newly formed module.

The above described prior art molding process has several drawbacks. For example, it is time consuming and results in a transceiver module which has a pitted outer surface. In addition, the silicone mold used in the molding process has a limited life of only three to five modules before a new mold must be employed.

The optoelectronic module is provided with a plurality of electrical pins for forming an electrical connection with a circuit card assembly. The electrical pins consist of solid wire strands with each pin having one end connected to the electronics within the module and the other end protruding from the module's potting material.

The portion of each pin which protrudes from the potting material is either soldered within a plated through-hole, which is provided by the circuit card assembly, or placed within a connector which grasps onto the pin. However, the flimsy wire pins are very susceptible to deformation during both the normal handling of the module and its removal and installation onto a circuit card assembly. Thus, the flimsy pins currently used in the prior art are difficult and time consuming to attach to a circuit card assembly since they must be periodically inspected and realigned. Furthermore, the pins may break if they are realigned too many times.

In addition in the electrical pins, the module also is equipped with two mounting ports for physically securing the module onto the circuit card assembly. The module is placed onto the circuit card assembly so that the mounting ports align with holes provided in the circuit card assembly. Once the module is properly aligned, screws are inserted through the holes in the circuit card assembly and into the mounting ports of the module. The screws are then tightened until the module is firmly affixed to the circuit card assembly.

Similarly, to remove the module from the circuit card assembly, the screws must be removed and the wires either unsoldered from the circuit card or pulled from the connector which is a timely and expensive process requiting multiple components.

Therefore, there is a need for a transceiver module which provides for a small, yet robust package, which is inexpensive to manufacture and can easily and quickly be installed and removed from a circuit card assembly. The present invention is such an apparatus.

In view of the above, it is an object of the present invention to provide a small transceiver module package.

It is another object of the present invention to provide a module package that has a robust and tamper resistent design.

Also, it is an object of the present invention to provide a module which can quickly be installed and replaced from a circuit card assembly.

Another object of the present invention is to provide a module package design that can quickly and easily be produced.

A further object of the present invention is to provide a module package that can be produced inexpensively.

Furthermore, it is an object of the present invention to provide a module with a coating which dissipates an electrostatic discharge and serves as an electromagnetic shield.

SUMMARY OF THE INVENTION

In one form of the invention, a robust optoelectronic transceiver module is provided which is quick, easy, and inexpensive to manufacture. The transceiver module has a main housing which consists of a potting box with potting material inserted therein. In addition, a circuit board is encased by the potting material.

The invention further provides for an optical subassembly to be mounted on a circuit board. In addition, the potting box has a recess which allows the optical subassembly to extend outside of the potting box. Furthermore, a recess cover may be provided for forming a liquid tight seal between the recess cover, the potting box, and the optical subassembly.

The optoelectronic transceiver module may also have a ribbon style connector attached to the circuit board and protruding from the main housing. The ribbon style connector may protrude from either the bottom or one end of the main housing. In addition, the ribbon style connector may comprise of either a male ribbon style connector or a resilient male ribbon style connector.

In another form of the invention, an optoelectronic transceiver module is provided which mounts onto a circuit card assembly. The module has a main housing with a bottom. Protruding from the bottom of the main housing is a ribbon style connector which allows for quickly installing and replacing the module from the circuit card assembly.

In yet another form of the invention, a method of assembling an optoelectronic transceiver module is provided. The steps of the method consists of placing a circuit board within a poring box and injecting potting material within the potting box. In addition, the circuit board may be affixed within the potting box after the circuit board is positioned within the potting box. Furthermore, a liquid tight recess cover may be mounted within the potting box's recess after the circuit board is positioned within the potting box.

Also, the method of manufacture provides for coating the potting box with a conductive metal before the circuit board is placed within the potting box or after the potting material is injected within the potting box. Moreover, a connector shell may be mounted onto the potting box after the potting material is injected within the potting box.

In still another form of the invention, a method of assembling an optoelectronic transceiver is provided which includes the steps of affixing a circuit board within a housing and securing a conductive metal coating onto the housing.

In another form of the invention, a potting box is provided for potting optoelectronic components which include an optical subassembly. The potting box includes a wall having a recess which allows the optical subassembly to extend outside of the potting box. In addition, a recess cover is provided for forming a liquid tight seal between the recess cover, the potting box, and the optical subassembly. Furthermore, the invention provides for the potting box to have a standoff column for mounting a circuit board within the potting box and an alignment guide for engaging a groove within the recess cover.

Various means for practicing the invention and other advantages and novel features thereof will be apparent from the following detailed description of an illustrative preferred embodiment of the invention.

BRIEF DESCRIPTION OF THE DRAWINGS

There is shown in the drawings a preferred embodiment of the present invention, wherein like numerals in the various figures pertain to like elements, and wherein:

FIG. 3 is a bottom perspective view of the optoelectronic transceiver module depicted in FIG. 1;

FIG. 4 is an enlarged perspective view of the potting box used in the manufacture of the optoelectronic module depicted in FIGS. 1–3;

FIG. 5 is a perspective view of the recess cover used with the potting box of FIG. 4;

FIG. 6 is another enlarged perspective view of the potting box of FIG. 4;

DETAILED DESCRIPTION OF THE PRESENTLY PREFERRED EMBODIMENTS

Figure 1:
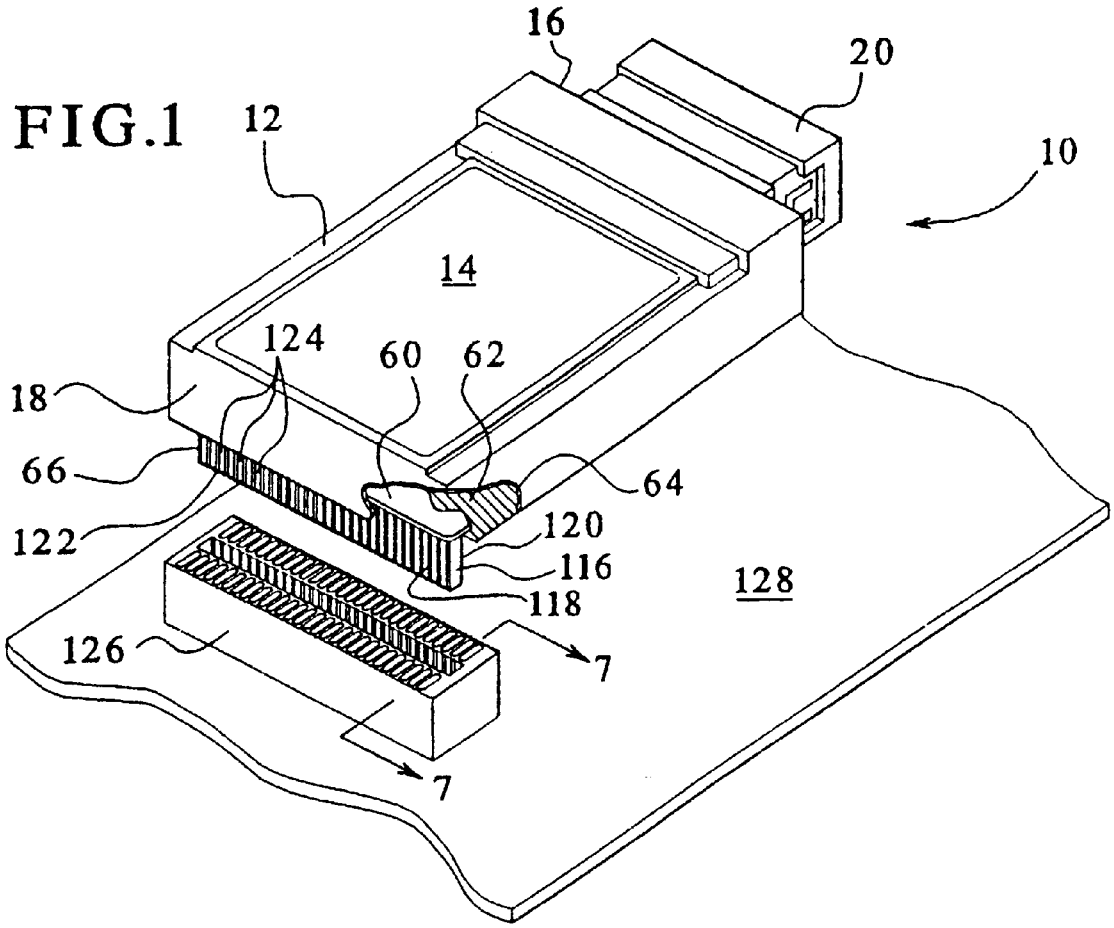
FIG. 1 is an enlarged perspective view of an optoelectronic transceiver module in accordance with the present invention and having a partial fragmentary view depicting the module's circuit board and potting material.

Referring to the drawing, and particularly to FIG. 1, an enlarged perspective view of an optoelectronic transceiver module 10 in accordance with the present invention is depicted. The module 10 has a main housing 12 which generally has the shape of an oblong box. The main housing 12 has a generally rectangular top 14 with a first end 16 and an opposite second end 18 extending perpendicularly from the top. Attached to the first end 16 of the main housing 12 is a transceiver connector 20 for receiving fiber optic plugs.

Figure 2:
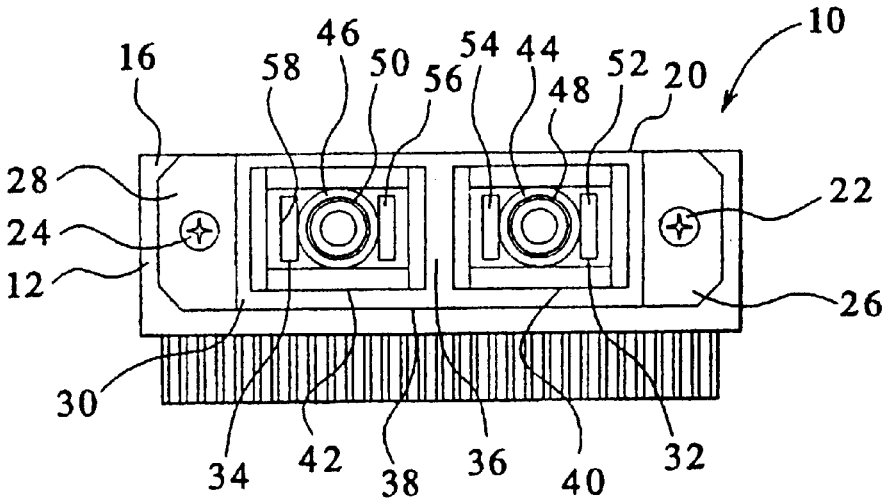
FIG. 2 is a front view of the optoelectronic transceiver module depicted in FIG. 1.

Turning to FIG. 2, a front view of the optoelectronic transceiver module 10 is depicted. The transceiver connector 20 is attached to the first end 16 of the main housing 12 by two screws 22,24. The two screws 22,24 extend through the transceiver connector's mounting ears 26,28 and into the main housing 12. Extending perpendicularly from the mounting ears 26,28 is a generally rectangularly shaped connector shell 30. The connector shell 30 provides two receptacles 32,34 for receiving fiber optic connector plugs. The receptacles 32,34 are formed by the connector shell 30 along with a divider wall 36 which extends along the center of the connector shell. Furthermore, located in the bottom 38 of each receptacle 32,34 is a keying channel 40,42 which extends toward the first end 16 of the main housing.

In the preferred embodiment, the receptacles 32,34 of the connector shell 30 are specifically dimensioned to receive an SC duplex plug. Therefore, the keying channels 40,42 ensure that an SC plug will be inserted so that receptacle 32 will only accept a plug for sending data and receptacle 34 will only accept a plug for receiving data.

Extending from the main housing 12 and into each of the receptacles 32,34 is an optical subassembly 44,46. As previously indicated, the optical subassembly 44 is for sending transmissions over a data link and the optical subassembly 46 is for receiving transmissions over a data link. In order to facilitate the connection between the transceiver 10 and the data links, each optical subassembly has a ferrule receiving portion 48,50. The ferrule receiving portion 48,50 couples with the SC plug. Furthermore, the transceiver's latch members 52,54,56, and 58 firmly hold the SC plug in contact with connector 20.

The actual sending and receiving of optically encoded data is performed by a laser diode within the optical subassembly 44 and a photo diode within the optical subassembly 46. Both the laser diode and the photo diode are electrically connected to a circuit board which is mounted within the main housing 12.

Turning back to FIG. 1, a portion of the circuit board 60 is depicted. Incorporated onto the circuit board 60 is circuitry for transmitting and receiving optically encoded data (circuitry not shown). The circuit board 60 is encased in potting material 62 and a poring box 64 which forms the main housing 12. The potting material 62 encases the circuit board 60 such that only the circuit board's male ribbon style connector 66 extends from the potting material 62.

Turning to FIG. 3, a perspective view of the bottom 68 of the transceiver module 10 is depicted. In the preferred embodiment, the bottom 68 has two mounting ports 70,70 which are adjacent to the first end 16 of the main housing 12. In addition, the male ribbon style connector 66 protrudes perpendicularly from the bottom 68 and is adjacent to the second end 18 of the main housing 12.

In an alternative embodiment, the ribbon style connector 66 may protrude perpendicularly from the second end 18 of the module 10 so that it can be connected to a circuit card assembly in a direction which is parallel to the direction of insertion of the optic plugs into the module's receptacles. However, in this alternative embodiment, another recess cover will be needed in order to prevent potting material from escaping the second end of the potting box.

Referring to FIG. 4, an enlarged perspective view of the optoelectronic module's potting box 64 is depicted. The potting box 64 forms the outer housing of the optoelectronic module. Thus, the potting box generally has the shape of an oblong box with a rectangular bottom 72, two parallel side walls 74,74, a first end wall 76, and an opposite second end wall 78. In a preferred embodiment, the potting box 64 is injection molded of a polymer material such as VALOX, STANYL, or any other glass-filled heat resistent material which can withstand solder reflow temperatures. The use of such a potting box eliminates the need for a silicone mold required by prior art modules. In addition, it is preferred that the potting box 64 be either plated, wet plated, or vacuum metalizied with an aluminum or stainless steel coating in order to dissipate an electrostatic discharge and provide for electromagnetic shielding.

As previously indicated, all of the transceiver's latch members 52, 54, 56, and 58 extend from the first wall 76 of the potting box 64. Also, the first end wall 76 of the potting box furnishes the mounting ports 70,70 which are located on the bottom of the main housing. In a preferred embodiment, the latch members 52, 54, 56 and 58 are integrally molded with the potting box 64.

Circuit board standoff columns 80 are also provided by the potting box 64 (only one standoff column is depicted in FIG. 4). Each standoff column protrudes from the bottom 72 of the potting box 64 and is positioned next to the first end wall 76 and one of the side walls 74,74 for supporting the circuit board 60. The standoff columns 80 have a length equal to approximately half the depth of the potting box 64 with the distal end of the column having a circuit board mounting port 82.

As depicted in FIG. 4, the first wall 76 of the potting box 64 has a recess 84 for allowing the placement of the circuit board's optical subassemblies. The recess 84 has two semicircular through-ports 86,86. Within each through-port 86,86 are two guide beams 88,90 which are positioned on each end of the through-port's semicircle for positioning the optical subassemblies 44,46.

Also located on the first wall 74 are two recess cover alignment guide beams 92,94. The alignment guide beams 92,94 boarder each side of the recess 84 and extend along the entire depth of the recess. The bottom of the recess 84 has three flat mating surfaces 95 (only two of the mating surfaces are depicted in FIG. 4).

Correspondingly, referring to FIG. 5, a recess cover 96 is depicted for placement within the recess located in the first wall of the potting box. Preferably, the recess cover 96 is made of the same material as the potting box and is either plated, wet plated, or vacuum metalizied with an aluminum or stainless steel coating.

In FIG. 5, the recess cover 96 has two semicircular through-ports 98,100. Within each of the through-ports 98,100 are two guide beams 102,104 positioned on each end of the through-port's semicircle. Also, the top of the recess cover includes three flat mating surfaces 105.

The recess cover 96 firmly mounts within the recess of the potting box's first wall so that the mating surfaces 95 and 105 of both the recess 84 and the recess cover 96 will abut each other. The recess cover 96 includes three indentions 106 which allow the cover to be positioned around the location where the latch members 52, 54, 56, and 58 attach to the potting box. In addition, on each end of the recess cover 96 there are alignment grooves 108, 110 which provide for sliding engagement with the alignment guide beams 92,94 bordering the recess within the potting box's first wall.

Referring back to FIG. 4, during the manufacture of the transceiver module the circuit board is placed in the potting box 64 with the male ribbon connector protruding outside of the potting box and the circuit board's optical subassemblies protruding out of the recess 84 in the first wall 76. The optical subassemblies 44,46 are properly positioned within the potting box 64 by the alignment guides 88,90 located within each through-port 86,86.

Once positioned within the potting box 64, the circuit board 60 is affixed by two screws which are mounted to the standoff columns 80 via the circuit board mounting ports 82.

Once the circuit board 60 is secured within the potting box 64, the recess cover 96 is mounted onto the first end wall 76. The recess cover 96 is mounted by engaging its alignment grooves 108,110 with the potting box's recess cover alignment guide beams 92,94. When the recess cover 96 is slid into position, the cover's through-ports 98,100 and associated alignment guide beams 102,104 will adjoin the circuit board's optical subassemblies 44,46. Furthermore, due to the fight tolerances of both the potting box 64 and the recess cover 96, a liquid fight seal will be formed between the potting box 64, the recess cover 96, and the optical subassemblies 44,46. Thus, with the recess cover 96 in place, potting material is injected within the potting box 64 for encasing the circuit board 60. The time to mold the module by the above method is reduced by approximately 90% over the prior art molding process because no hand caulking is needed to form the liquid fight seal.

Finally, referring to FIG. 6, the connector shell 20 (See FIGS. 1 & 2) is mounted onto the first end wall 76 of the potting box 64 after the potting material has cured. Alignment of the connector shell 20 is provided by two mounting posts 112, 112. Each mounting post 112 has a bore 114 which facilitates the attachment of the connector shell 20, by the use of the previously mentioned screws, onto the potting box 64.

In an alternative embodiment, the ribbon style connector 66 may protrude perpendicularly from the second end 18 of the module 10 so that it can be connected to a circuit card assembly in a direction which is parallel to the direction of insertion of the optic plugs into the module's receptacles. However, in this alternative embodiment, another recess cover will be needed in order to prevent potting material from escaping the second end of the potting box.

Referring back to FIG. 1, the male ribbon style connector 66 protruding from the module 10 has a beam portion 116, made of insulative material, which extends perpendicularly across the length of the circuit board 60. The male ribbon style connector 66 also has a first side 118, an opposite second side 120, and a distal end 122. Extending perpendicularly from the circuit board 60 on both the first side 118 and the second side 120 of the male ribbon style connector 66 are twenty-eight electrical contacts 124. Each electrical contact 124 consists of a strip of conductive material which is affixed to the male ribbon style connector 66 and is electrically connected to the circuitry mounted on the circuit board 60.

Figure 7:
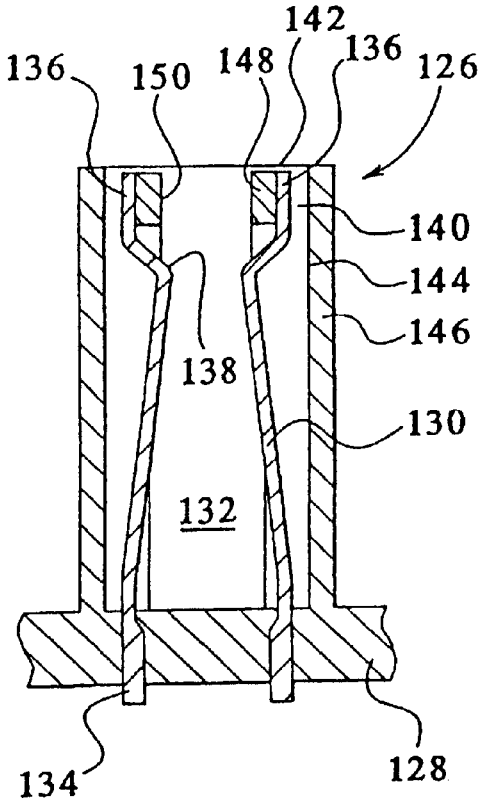
FIG. 7 is an enlarged cut-away side view of the female ribbon style connector taken along line 7—7 of FIG. 1.

Correspondingly, the male ribbon style connector 66 couples to a female ribbon style connector 126 which is mounted onto the circuit card assembly 128. Referring to FIG. 7, an enlarged cut-away side view is shown of the female ribbon style connector 126 taken along line 7—7 of FIG. 1. The female ribbon style connector 126 has two parallel rows of twenty-eight (28) contact beams 130,130 contained within a contact chamber 132 (only one contact from each row is depicted). Each contact beam 130 is constructed of a flat strip of conductive metallic material. Furthermore, each contact beam 130 has a first end 134, a second distal end 136, and a bend 138 which is located adjacent to the second end and extends toward the contact beam located in the opposite row.

The female ribbon style connector 126 is mounted onto the circuit card 128 such that the first end 134 of each contact beam 130 extends through the circuit card assembly. Likewise, the second end 136 of each contact beam 130 extends within a travel limitation slot 140 formed in the top 142 of the female ribbon style connector 126. Each slot 140 provides a backstop 144, consisting of one of the connector's walls 146, and a frontstop 148. Correspondingly, contact beams 130,130 are positioned in the chamber 132 such that the second end 136 of each contact beam 130 resiliently urges against the frontstop 148.

In order to provide access to the contact beams 130,130 within the female ribbon style connector 126, the top 142 of the connector has a slot 150 positioned between the two rows of contact beams. Correspondingly, in order to make an electrical connection between the female ribbon style connector 126 and the male ribbon style connector 166 depicted in FIG. 1, the distal end 122 of the male ribbon style connector is inserted within the female connector's slot 150. As the male ribbon style connector 66 is pushed further within the female connector's chamber 132 the two rows of contact beams 130,130 will be forced to separate further from each other. In addition, each contact beam 130 will resiliently urge against a corresponding electrical contact 124 mounted on the male ribbon style connector 66. Thus, an electrical connection will be formed between the male ribbon style connector's electrical contacts 124,124 and the female connector's contact beams 130,130.

Similarly, to disconnect the male ribbon style connector's electrical contacts 124,124 from the female connector's contact beams 130,130 the male connector 66 is simply pulled from the chamber 132 of the female connector. Once the male ribbon style connector 66 has been removed from the chamber 132, the contact beams 130 of the female connector 126 will resiliently regain the configuration of FIG. 7, whereby the second end 136 of each contact beam will abut its corresponding frontstop 148.

Figure 8:
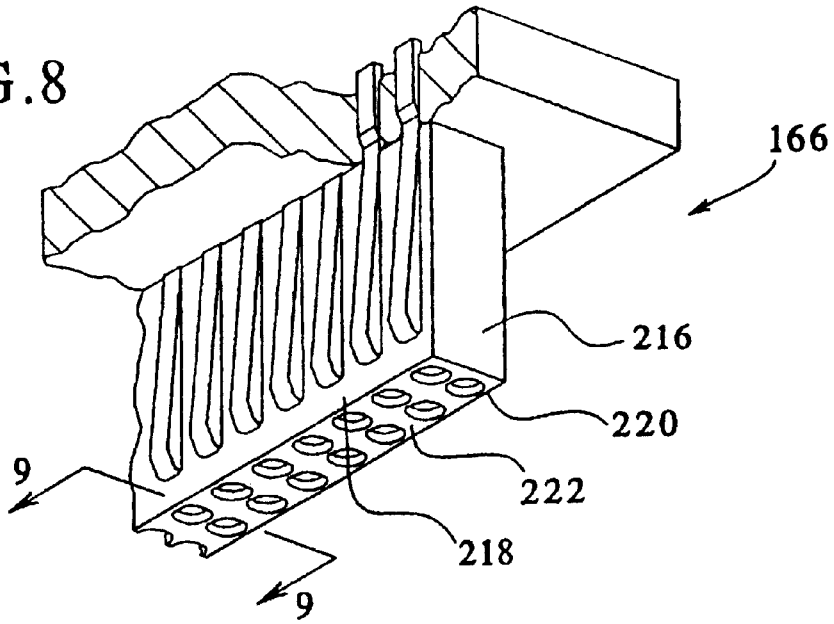
FIG. 8 is an enlarged perspective view, along with a partial fragmentary view, of a resilient male ribbon style connector for use with the optoelectronic transceiver module of FIGS. 1–3.

Turning to FIG. 8, an enlarged perspective view, along with a partial fragmentary view, is depicted of a resilient male ribbon style connector 166. The connector 166 includes a beam type housing 216 having a first side 218, an opposite second side 220, and a distal end 222. The resilient male ribbon style connector 166 in FIG. 8 serves as another embodiment of the male ribbon style connector depicted in FIGS. 1–3 wherein the male connector in FIG. 8 is resilient and the male connector in FIGS. 1–3 is non-resilient. It should be noted, however, that other means for quickly installing and replacing the module from a circuit card assembly may *be used.*

Figure 9:
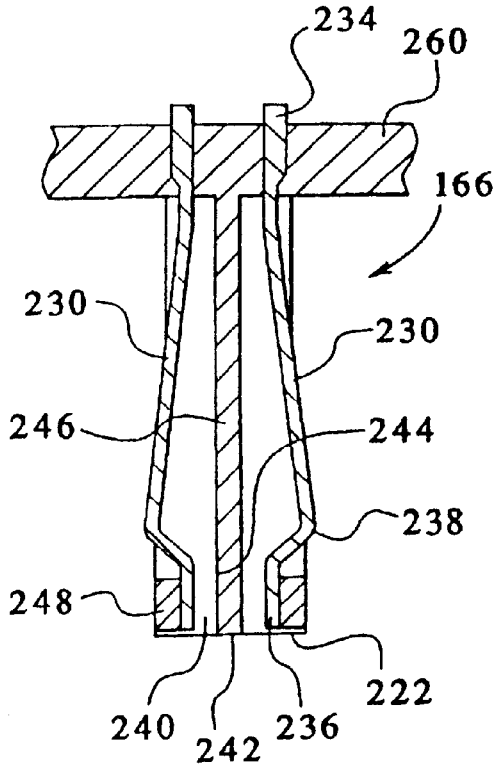
FIG. 9 is a cut-away side view of the resilient male ribbon style connector taken along line 9—9 of FIG. 8.

Referring to FIG. 9, an enlarged cut-away side view of the resilient male ribbon style connector 166 is shown taken along line 9—9 of FIG. 8. The male ribbon style connector 166 has two parallel rows of twenty-eight (28) contact beams 230,230 (only one contact from each row is depicted). Each contact beam 230 is constructed of a flat strip of conductive metallic material. Furthermore, each contact beam 230 has a first end 234, a second distal end 236, and a bend 238 which is located adjacent to the second end and extends away from the contact beam located in the opposite row.

The male ribbon style connector 166 is mounted onto the module's circuit board 260 such that the first end 234 of each contact beam 230 extends through the circuit board. In a preferred embodiment, the first end 234 of the contact 230 is inserted within a through-hole of the circuit board 260 which contains traces for providing an electrical connection from the contact 260 to components mounted on the board. Likewise, the second end 236 of each contact beam 230 extends within a travel limitation slot 240 formed in the top 242 of the resilient male ribbon style connector 166. Each slot 240 provides a backstop 244, consisting of the connector's support wall 246, and a frontstop 248. Corresponding, contact beams 230,230 are positioned such that the second end 236 of each contact beam 230 resiliently urges against the frontstop 248.

Access for making an electrical connection with the contact beams 230,230 is provided since they protrude from the male ribbon style connector 166 in the area around the bends 238,238. Correspondingly, in order to make an electrical connection between a female ribbon style connector and the resilient male ribbon style connector 166, the distal end 222 of the male ribbon style connector is inserted within a slot provided by the female connector. As the male ribbon style connector 166 is pushed within the female connector, the two rows of contact beams 230,230 will be forced to compress towards each other. In addition, each contact beam 230 will resiliently urge against a corresponding electrical contact mounted within the female ribbon style connector. Thus, an electrical connection will be formed between the male ribbon style connector's electrical contact beams 230, 230 and the female connector's contact beams.

Similarly, to disconnect the resilient male ribbon style connector 166 from the female connector, the male connector is simply pulled from the female connector. Once the male ribbon style connector 166 has been removed, the contact beams 230,230 will resiliently regain the configuration of FIG. 9, whereby the second end 236 of each contact beam will abut its corresponding frontstop 248.

It should be understood that in describing the top and bottom portions of the transceiver module and its respective potting box components, the terms "top" and "bottom" are used by way of example only due to the orientation of the drawings. It should also be understood that various changes and modifications to the presently preferred embodiments described herein will be apparent to those skilled in the art. Furthermore, although the transceiver module depicted in the presently preferred embodiment has its male ribbon style connector extending from the bottom, it should be understood from the outset that the connector can be configured to extend, for example, from the second end of the transceiver. Therefore, changes and modifications may be made without departing from the spirit and scope of the present invention and without diminishing its attendant advantages. Thus, it is intended that such changes and modifications be covered by the appended claims.

We claim:

1. A [potting box for potting] *module for* optoelectronic components which includes an optical [sub] assembly, said [potting box] *module* comprising:

a) a [wall] *housing* having [a recess] *a first end and a second end and a printed circuit board mounted therein and said optical assembly electrically connected to the printed circuit board, said optical assembly including a transmitting optical subassembly and a receiving optical subassembly and the housing includes an opening at the first end* for allowing said optical [sub] assembly to [extend] *communicate* outside of said [potting box] *housing in order for the optical assembly to be coupled with a duplex fiber optic plug providing for bi-directional data transmission over an optical data link*; [and]

b) a [recess] cover [for forming a liquid tight seal between said recess cover, said potting box, and] *enclosing* said optical [sub] assembly;

c) *said housing having an electrically conductive outside surface portion; and* d) *an electrical connector at the second end of the module, the electrical connector having an insulative mating surface having a first side having electrical contacts including an area oriented substantially parallel to the first side and the insulative mating surface and electrical contacts slidingly engage a connector of a circuit card assembly to quickly install and remove the module from within said circuit card assembly and having said electrically conductive outside surface portion of said housing provide for electrostatic discharge.*

2. The [potting box] *module* of claim 1, further comprising a standoff column for mounting a circuit board containing said optoelectronic components.

3. The [potting box] *module* of claim 1, with said wall having an alignment guide for engaging a groove within said recess cover.

4. A robust optoelectronic transceiver module which is quick, easy, and inexpensive to manufacture, said module comprising:

a) a main housing comprising a potting box and potting material contained within said potting box, said potting box having a bottom and a recess;

b) a circuit board encased within said potting material and having an optical subassembly mounted onto said circuit board, through said recess, and outside of said potting box;

c) a male ribbon style connector connected to said circuit board and protruding from said bottom of said main housing for quickly installing and replacing said module; and d) a recess cover for forming a liquid tight seal between said recess cover, said potting box, and said optical subassembly.

5. An optoelectronic transceiver module comprising:

a) a main housing comprising a potting box and potting material contained within said potting box and having a recess for allowing said optical subassembly to extend outside of said potting box;

b) a circuit board encased within said potting material and an optical subassembly mounted onto said circuit board; and c) a recess cover for forming a liquid-tight seal between said recess cover, said potting box and said optical subassembly.

6. An optoelectronic transceiver module comprising:

a) a main housing comprising a potting box and potting material contained within said potting box;

b) a circuit board encased within said potting material; and c) a male ribbon style connector connected to said circuit board and protruding from said main housing for quickly installing and replacing said module.

7. The optoelectronic transceiver module of claim 6 wherein said ribbon style connector is a resilient male ribbon style connector.

8. A method of assembling an optoelectronic transceiver comprising the steps of:

a) placing a circuit board within a potting box;

b) injecting potting material within said potting box; and c) mounting a liquid-tight recess cover within a recess in said potting box after said circuit board is positioned within said potting box.

9. A method of assembling an optoelectronic transceiver comprising the steps of:

a) placing a circuit board within a potting box;

b) injecting potting material within said potting box; and c) coating said potting box with a conductive metal before said circuit board is placed within said potting box.

10. A method of assembling an optoelectronic transceiver comprising the steps of:

a) placing a circuit board within a potting box;

b) injecting potting material within said potting box; and c) coating the potting box with a conductive metal after said potting material is injected within said potting box.

11. A method of assembling an optoelectronic transceiver comprising the steps of:

a) placing a circuit board within a potting box;

b) injecting potting material within said potting box; and c) mounting a connector shell onto said potting box after said potting material is injected within said potting box.

12. An optoelectronic module comprising:

a) a housing including a first end wall having a through port;

b) a circuit board mounted within said housing and an optical subassembly mounted onto said circuit board adjacent said through port; and c) an electrical connector at a second end of said housing connected to said circuit board and protruding from said housing for quickly installing and replacing said module to or from a circuit card assembly and the electrical connector including at least a pair of metallic fingers extending from said housing.

13. The optoelectronic module of claim 12 wherein the metallic fingers are separated by an insulator.

14. The optoelectronic module of claim 12 wherein the electrical connector includes a beam of insulative material having electrical contacts.

15. The optoelectronic module of claim 14 wherein the electrical connector protrudes perpendicularly from the second end and [poarallel] *parallel* to the circuit board.

16. The optoelectronic module of claim 12 wherein said electrical connector is a male ribbon style connector.

17. The optoelectronic module of claim 12 wherein said housing includes a mounting member for facilitating the insertion and removal of said module to and from a circuit card assembly.

*18. An optoelectronic module comprising:*

*a housing having a first end, a second end and an electrically conductive outside surface;*

*a circuit board mounted within said housing;*

*a fiber optic SC duplex receptacle at said first end;*

*an optical subassembly electrically connected to said circuit board and adjacent said SC duplex receptacle; and*

*a male ribbon-style electrical connector at said second end of said housing protruding from said housing for quickly installing and replacing said module to or from a circuit card assembly, said electrical connector capable of mating with a cooperatively-configured female ribbon-style electrical connector on said circuit card assembly.*

*19. The optoelectronic module as claimed in claim 18, wherein metallic fingers of said electrical connector are directly connected to electrical traces on said circuit board.*

*20. The optoelectronic module as claimed in claim 18, wherein said electrically conductive outside surface is provided by a metal plating on said housing.*

*21. The optoelectronic module as claimed in claim 18, wherein said electrically conductive outside surface is provided by a metallic coating on said housing.*

*22. The optoelectronic module as claimed in claim 18, wherein said electrically conductive outside surface is metal.*

*23. The optoelectronic module as claimed in claim 18, further comprising:*

*a plurality of latch members for securing a fiber optic SC duplex connector plug to said SC duplex receptacle.*

*24. The optoelectronic module as claimed in claim 18, wherein said electrically conductive outside surface provides for the dissipation of electrostatic discharge.*

*25. The optoelectronic module as claimed in claim 18, wherein said electrically conductive outside surface provides for electromagnetic shielding.*

*26. The optoelectronic module as claimed in claim 18, wherein said fiber optic SC duplex receptacle has an electrically conductive surface.*

*27. An optoelectronic module comprising:*

*a housing having a first end, a second end and an electrically conductive outside surface;*

*a circuit board mounted within said housing;*

*a fiber optic receptacle at said first end;*

*an optical subassembly electrically connected to said circuit board and adjacent said receptacle; and*

*a ribbon-style electrical connector at said second end of said housing connected to said circuit board and protruding from said housing for quickly installing and replacing said module to or from a circuit card assembly, said electrical connector including at least a pair of metallic fingers protruding from within said housing.*

*28. The optoelectronic module as claimed in claim 27, wherein said metallic fingers are directly connected to electrical traces on said circuit board.*

*29. The optoelectronic module as claimed in claim 27, wherein said electrical connector is a male ribbon-style connector capable of mating with a cooperatively-configured female ribbon-style electrical connector on said circuit card assembly.*

*30. The optoelectronic module as claimed in claim 27, wherein said fiber optic receptacle is configured to receive a fiber optic SC duplex connector plug.*

*31. The optoelectronic module as claimed in claim 27, wherein said electrically conductive outside surface provides for dissipation of electrostatic charges.*

*32. The optoelectronic module as claimed in claim 27, wherein said electrically conductive outside surface provides for electromagnetic shielding.*

*33. The optoelectronic module as claimed in claim 27, wherein said electrically conductive outside surface is provided by a metal housing.*

*34. The optoelectronic module as claimed in claim 27, wherein said electrically conductive outside surface is provided by a metallic coating on said housing.*

*35. The optoelectronic module as claimed in claim 27, wherein said electrically conductive outside surface is metal.*

*36. The optoelectronic module as claimed in claim 27, wherein said ribbon-style electrical connector includes a beam portion of insulative material having a first side and second side and at least twenty contact fingers dispersed along said first side and said second side of said beam portion.*

*37. The optoelectronic module as claimed in claim 27, wherein said fiber optic receptacle has an electrically conductive surface.*

*38. An optoelectronic module comprising:*

*a housing having a first end, a second end and a means for providing dissipation of electrostatic charge;*

*a circuit board mounted within said housing;*

*a fiber optic receptacle at said first end;*

*an optical subassembly electrically connected to said circuit board and adjacent said receptacle; and*

*a ribbon-style electrical connector at said second end of said housing connected to said circuit board and protruding from said housing for quickly installing and replacing said module to or from a circuit card assembly wherein said electrostatic charge is dissipated.*

*39. The optoelectronic module as claimed in claim 38, wherein said fiber optic receptacle has an electrically conductive surface.*

*40. The optoelectronic module as claimed in claim 38, wherein said means for providing dissipation includes an electrically conductive outside surface of said housing.*

*41. The optoelectronic module as claimed in claim 40, wherein said electrically conductive outside surface is provided by a metallic coating on said housing.*

*42. The optoelectronic module as claimed in claim 40, wherein said electrically conductive outside surface is provided by a metal plating on said housing.*

*43. The optoelectronic module as claimed in claim 40, wherein said electrically conductive outside surface provides for electromagnetic shielding.*

*44. An optoelectronic module comprising:*

*a housing having a first end, a second end and electromagnetic shielding;*

*a circuit board mounted with the housing;*

*a fiber optic receptacle at the first end;*

*an optical subassembly electrically connected to the circuit board and adjacent said receptacle; and*

*a ribbon-style electrical connector at the second end of said housing connected to said circuit board and protruding from said housing for quickly installing and replacing said module to or from a circuit card assembly.*

*45. The optoelectronic module as claimed in claim 44, wherein said fiber optic receptacle has an electrically conductive surface.*

*46. The optoelectronic module as claimed in claim 44, wherein said electromagnetic shielding includes an electrically conductive outside surface of said housing.*

*47. The optoelectronic module as claimed in claim 46, wherein said electrically conductive outside surface is provided by a metallic coating on said housing.*

*48. The optoelectronic module as claimed in claim 46, wherein said electrically conductive outside surface is provided by metal plating on said housing.*

*49. The optoelectronic module as claimed in claim 46, wherein said electrically conductive outside surface provides for dissipation of electrostatic charge.*

* * * * *